Sept. 12, 1950 M. V. McGONIGLE 2,522,391
CARRIER FOR SMALL ANIMALS
Filed Sept. 24, 1947
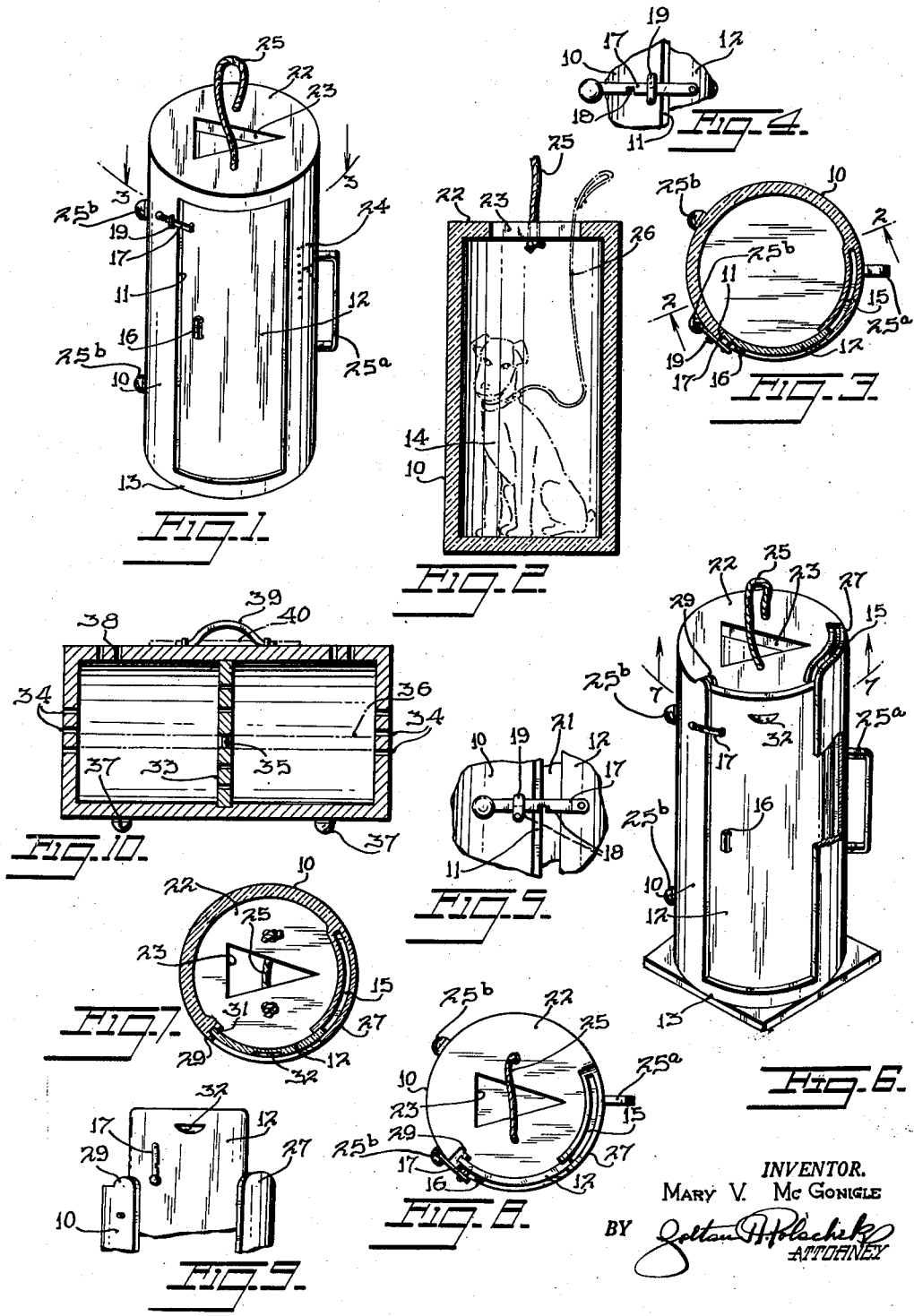
INVENTOR.
MARY V. McGONIGLE
BY
ATTORNEY Patented Sept. 12, 1950

2,522,391

UNITED STATES PATENT OFFICE 2,522,391

CARRIER FOR SMALL ANIMALS

Mary V. McGonigle, Woodside, N. Y.

Application September 24, 1947, Serial No. 775,896

3 Claims. (Cl. 119—17)

This invention relates to a carrier for small dogs, bunny rabbits, and other small animals and birds.

It is an object of the present invention to provide a carrier for small animals which is of hollow cylindrical shape and made of plastic material so that it can be well ornamented and wherein the animal can either curl up in the bottom of the carrier or may sit up as it may desire, there being sufficient space or height to permit the animal to sit up easily and there being sufficient diameter to permit the animal to curl up in the bottom and whereby a carrier is provided which is of minimum size and easily transported.

It is another object of the present invention to provide a cylindrical shape animal carrier, a door which can be adjusted laterally and retained in the adjusted position to give the animal sufficient air or which can be opened to a greater extent to permit the removal of the animal and wherein this door can be operated either by sliding the same laterally or by raising it upwardly.

Other objects of the present invention are to provide an animal carrier which is of small size, of simple construction, inexpensive to manufacture and efficient in operation.

According to the invention, there is provided a carrier which is of hollow cylindrical shape having top and bottom portions and having an opening extending vertically throughout the height of the casing and a slide door within the opening adapted to be slid into the casing wall to provide an opening through which the animal can be extended into the casing or removed. A catch is provided for holding the sliding door either in a closed position or in a slightly opened position so as to give air to the animal.

The top of the casing has a vent opening through which air can be taken. There may also be a series of perforations in the casing. This casing is made of plastic material, has a glossy finish on its exterior and can be of different colors throughout a portion of the same. The door or other portions can be of bevelled transparent plastic which may be safely handled without cutting one's hand and so that the dog can be observed from the exterior and the carrier can be disposed in a position to either display the dog or to keep the same from display.

According to a modified form of the invention, the sliding door has such sliding connections with the casing that not only can it be slid laterally, but it can be slid upwardly, out of the top of the casing and removed for cleaning purposes.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the carrier for animals embodying the features of the present invention.

Fig. 2 is a longitudinal cross sectional view taken on line 2—2 of Fig. 3.

Fig. 3 is a transverse cross sectional view taken on line 3—3 of Fig. 1.

Fig. 4 is a fragmentary view of the area of the casing surrounding the catch, showing the catch in a position whereby to maintain the door in its closed position.

Fig. 5 is a fragmentary view similar to Fig. 4 showing the catch position over the pin to retain the door in a slightly opened position whereby to give ventilation to the animal.

Fig. 6 is a perspective view of a modified form of the invention wherein the door can be slid upwardly as well as laterally.

Fig. 7 is a transverse cross sectional view taken on line 7—7 of Fig. 6.

Fig. 8 is a top plan view of the form of the invention shown in Fig. 6.

Fig. 9 is a fragmentary elevational view showing the door in a partially raised position.

Fig. 10 is a longitudinal cross sectional view showing a modified form of the invention used in horizontal position.

Referring now particularly to Figs. 1 to 5, 10 represents a tall cylindrically shaped casing having a door opening 11 with a sliding door 12 therein. The casing 10 is formed of molded plastic material and may be made opaque throughout a portion of the same but the door can be of transparent plastic. The bottom end of the casing is closed by a floor 13 on which the animal 14 is resting. The diameter of the casing is sufficient to permit the animal to curl up on the bottom of the floor. The casing is also of sufficient height to permit the animal to sit up. A casing of this sort can thus be made of minimum size and consume little space more than is necessary for the animal. In the wall of the casing at one side of the openings is a slot 15 into which the door can be slid. A handle 16 is provided on the door to effect its sliding movement. On the upper side of the door is a catch lever 17 which has a plurality of indentations 18 on its lower edge adapted to fit over a hook 19 on the casing.

As shown in Figs. 4 and 5, the latch 17 can be placed in either of two positions whereby to retain the door in closed position or in a slightly open position, as shown in Fig. 5, so as to provide air space 21 through which the animal can receive air. The top of the casing is closed as indicated by a flat top portion 22 having an air vent 23 therein. Also, there may be provided a series of perforations 24 in the side wall of the casing. On the top plate portion 22 is a handle 25 by which the carrier can be transported. The handle may be a short loop and be placed over a person's wrist or made longer to be carried as a sling. The animal may have a leash 26 which can extend outwardly through the vent opening 23. Inasmuch as the vent opening is of tapered V-shape the leash can be extended into the end of the opening and be retained in tight engagement therewith. An auxiliary handle 25a may also be provided on the side of the carrier and rubber bumpers 25b secured to the opposite side to prevent rolling of the carrier in horizontal position.

Referring now to Figs. 6 to 9, there is shown a modified form of the invention. The casing 10 is formed so that its top portion has a raised formation 27 in which the slot or groove 15 is extended. This formation 27 provides an extension of the groove and is opened at its upper end so as to permit the door to be pulled upwardly from the casing. At the opposite side of the opening is a raised formation 29 and a groove 31 serving as a guideway for the opposite edge of the door as the door is raised upwardly to permit the release of the animal. A hand indentation 32 is used when the door is to be raised. The door is raised by grasping the hand indentation 32 and lifting the door thereby only partially, as illustrated in Fig. 9 or totally for the purpose of providing access to the carrier or to clean the door. The door can also be slid laterally as in the case of the first described form of the invention.

Fig. 10 is an additional modified form of the invention whereby the same casing is used in a horizontal position to accommodate more than one small animal or bird by the addition of a centrally located removable disc-shaped perforated partition 33 and a series of perforations 34 on both ends for cross ventilation and on the top side 38 for further ventilation, whereas the periphery bevelled center 35 of the partition 33 provides a means for inserting a rod 36 through the entire length for use as a perch for birds. A plurality of rubber bumpers 37 on the bottom of the case prevents it from rolling when not being carried by the means provided either a strip 39 of plastic or leather that may be flattened when not in use as designated at 40.

It is to be understood that the carrier body may be made of any suitable material and color combination. It may be finished with soft padding material.

The carrier may also be equipped with suitable name plates when it is used by pet shop owners for delivering animals, birds, etc., and may also be pushed or pulled by a suitable handle, rod or wheels.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an animal carrier having a hollow vertical cylindrically-shaped casing including top and bottom portions on the ends of the cylinder and an opening in the cylinder wall, a sliding door extended through the opening and adapted to be slid to one side thereof to provide access to the carrier, and a handle connected to the top portion of the casing by which the same can be transported, said top portion having a ventilating opening of V-shape to receive the leash of an animal and retain the same against slippage.

2. An animal carrier comprising a casing of hollow cylindrical shape, top and bottom portions of the ends of the cylinder, an opening in the cylinder wall, a sliding door extended across the opening to be slid to one side thereof to provide access to the interior of the carrier, a catch for retaining the door in its closed position and, a handle connected to the top portion of the casing by which the same can be transported, said casing being formed along one edge of the opening with a slot into which said door is received when said door is slid to one side for opening said opening, said slot being open at its top so that said door may be raised vertically and completely disconnected from said casing when desired.

3. An animal carrier comprising a casing of hollow cylindrical shape, top and bottom portions on the ends of the cylinder, an opening in the cylinder wall, a sliding door extended across the opening to be slid to one side thereof to provide access to the interior of the carrier, a catch for retaining the door in its closed position, and a handle connected to the top portion of the casing by which the same can be transported, said casing being formed along one edge of the opening with a slot into which said door is received when said door is slid to one side for opening said opening, a groove formed in the material of said casing along the side of said opening opposite said slot for receiving the free edge of said door in the closed position thereof, said slot and said groove being open at their top ends so that said door may be raised vertically and disconnected from said casing when desired.

MARY V. McGONIGLE.

REFERENCES CITED

The following references are of record in the file of this patent:

UNITED STATES PATENTS

| Number | Name | Date |
|---|---|---|
| 532,483 | Poertner et al. | Jan. 15, 1895 |
| 618,445 | Smith et al. | Jan. 31, 1899 |
| 1,200,557 | Whitmore | Oct. 10, 1916 |
| 1,417,555 | Orth | May 30, 1922 |
| 1,485,995 | Schaffer | Mar. 4, 1924 |
| 1,813,659 | Carlson | July 7, 1931 |
| 1,883,646 | Ellis | Oct. 18, 1932 |
| 1,942,713 | Klinka | Jan. 9, 1934 |
| 2,079,458 | Leichtfuss | May 4, 1937 |